United States Patent Office 2,947,794
Patented Aug. 2, 1960

2,947,794
2,2-DI(p-TOLYL) PROPANE PREPARATION

John C. Petropoulos, Norwalk, and Anthony T. Coscia, Stamford, Conn., assignors to American Cyanamid Company, New York, N.Y., a corporation of Maine No Drawing. Filed July 1, 1957, Ser. No. 668,920

11 Claims. (Cl. 260—668)

The present invention relates to an improved process for the manufacture of 2,2-di(p-tolyl) propane. More particularly, it is concerned with the condensation of 2-(p-tolyl)-2-chloropropane with toluene in the presence of a catalyst complex comprising the chloride of hydrogen, the chloride of aluminum and an organonitro compound.

Considerable time, money and effort have been expended in the development and commercialization of processes leading to the preparation of 2,2-di(p-tolyl) propane. The latter compound has gained prominence as an article of commerce and, particularly, as a valuable intermediate. For example, the corresponding oxidized product, 2,2-di-(p-carboxyphenyl) propane, is useful as a compound in the preparation of alkyd resins.

Until recently, most attempts at synthesizing di(p-tolyl) propane have been commercially unsuccessful. Recovery of the desired end product was unfortunately too small. Perhaps, the best of such processes is described in the recently issued United States Letters Patent No. 2,719,871. Therein, the known reaction between aromatic hydrocarbons and 2-aryl-2-chloropropane in the presence of Friedel-Craft catalyst is markedly improved by adding hydrogen chloride to suppress the formation of by-product 1,3,3,6-tetramethyl-1-(p-tolyl) indane. Greatly improved yields were obtained. Nevertheless, the process still produced the desired product and the indane derivative in the ratio of about 1.4:1, respectively.

It is an object of the present invention to provide a process for preparing 2,2-di(p-tolyl) propane by which this ratio is greatly improved to enable recovery of desired end product in yields hitherto unobtainable. It is a further object of the invention to provide a process for substantially reducing the formation of indanes and other contaminants. Other objects will become apparent to those skilled in the art from a reading of the specification as further detailed below.

According to the present invention, it has been discovered that the ratio can be increased to 10 to 1 or higher, by incorporating into the previously mentioned known reaction an organonitro compound at a temperature between minus (−) 30° C. and plus (+) 30° C., and preferably between −10° C. and +10° C. Unexpectedly, relatively small amounts of 1,3,3,6-tetramethyl-1-(p-tolyl) indane are detected.

In general, a preferred procedure is to admix an organo-nitro compound and a Friedel-Craft catalyst in toluene. To the latter catalyst mixture is added 2-(p-tolyl)-2-chloropropane in sufficient toluene containing hydrogen chloride. Alternatively, the organonitro compound may be added during reaction. However, the latter procedure is not preferred, due to the possibility of dimerization of the styrene resulting during the reaction and prior to its total addition.

The organonitro compound may be varied widely. For example, nitroalkanes and nitroaromatic hydrocarbon compounds are contemplated. Typically illustrative compounds are: nitroalkanes such as nitromethane, nitroethane and nitropropane, and nitroaromatics as nitrobenzene, nitrotoluene, nitroxylene, nitronaphthalene and equivalents thereof. In practice, the quantity of added organonitro compounds may also be varied. A good practice is the use of from about one (1) to about ten (10) moles of organonitro compound per mole of aluminum chloride. If a lesser mole quantity of nitro compound is used, somewhat reduced yields are noted. Larger amounts of the nitro compound may also be used. However, it has been found that such amounts do not materially add to the process in terms of yield, but detract economically from the process due to increased costs. A preferred range is one to five moles of the organonitro compound per mole of aluminum chloride.

The invention will be further described in the following examples which are merely illustrative and are not to be construed as being limitative. Unless otherwise stated, the parts given are by weight.

Example 1

A catalyst complex is prepared by charging to a suitable flask 174 parts of toluene (1.9 moles), 4 parts of anhydrous aluminum chloride (0.03 mole) and 10 parts of nitrobenzene (0.08 mole). The resultant clear, orange solution is next saturated with hydrogen chloride gas, while maintaining the contents therein at a temperature between 0° C. and 5° C.

In a separate vessel equipped with stirrer, funnel, gas inlet and gas outlet, there is charged 87 parts of dry toluene. Sufficient anhydrous hydrogen chloride gas is then bubbled into the flask, while cooling the mixture to 0° C. to saturate the mixture. A solution of 40 parts of α-p-dimethyl styrene in 44 parts of toluene is next added slowly, while maintaining the solution saturated with hydrogen chloride and while agitating at such a rate that the resultant exotherm is controlled at a temperature below about 5° C. Resultant solution comprising 2-(p-tolyl)-2-chloropropane is maintained at 0° C. or below under a stream of hydrogen chloride gas until the solution is added to the catalyst complex as prepared above.

The solution of 2-(p-tolyl)-2-chloropropane in toluene is now rapidly added to the catalyst solution with vigorous stirring under a steady stream of hydrogen chloride gas. The mixture is stirred for an additional twenty minutes while maintaining the temperature at about 5° C. Thereafter, about 350 parts of cold water are added, with agitation, at such a rate so that the temperature is not permitted to rise above 25° C. An organic layer forms and is separated. It is washed twice with 10% sodium hydroxide solution followed by a water wash. The washed solution is then dried over anhydrous potassium carbonate.

The so-dried solution is next subjected to distillation under reduced pressure, whereby excess toluene and nitrobenzene are removed. 2,2-di(p-tolyl) propane is distilled at 183° C. and 20 mm. Hg pressure. Resultant 2,2-di-(p-tolyl) propane solidifies upon cooling below 70° C. A yield of 56 parts corresponding to 82% is obtained. A second fraction is obtained by heating the remaining solution to a temperature of 198° C. and 20 mm. Hg pressure. Two (2) parts of compound (5%) corresponds to 1,3,3,6-tetramethyl-1-p-tolyl indane.

From the above, it will be seen that the ratio of the di(p-tolyl) propane to the tetramethyl tolyl indane is 28 to 1.

Example 2

The procedure of Example 1 is repeated in every essential detail except that 5 parts of nitromethane are substituted for the nitrobenzene therein. The yield of 2,2-di-(p-tolyl) propane corresponds to 82% (56 parts) as in Example 1. Upon cooling, the latter compound solidifies and is recrystallized from methanol to give needles of 2,2-di(p-tolyl) propane of melting point 79° C. Both infra-red and mass spectographic analysis indicate the correctness of the structure of the product.

As in the previous example, a second fraction is obtained on vacuum distillation at 20 mm. Hg pressure by increasing the temperature from 183° C. to 198° C. The distillate corresponds to 1,3,3,6-tetramethyl-1-(p-tolyl) indane. A yield of 4 parts or 10% is obtained. The ratio of 2,2-di(p-tolyl) propane to the tetramethyl tolyl indane is 14 to 1.

It is an advantage of the present invention that a process is provided for increasing the overall yield of desired 2,2-di(p-tolyl) propane by substantially preventing the formation and dimerization of α-methyl-p-methyl styrene from 2-(p-tolyl)-2-chloropropane. Nonetheless, in the absence of an organonitro compound, it appears that sufficient α-p-dimethyl styrene or its equivalent does form during the overall condensation reaction between the chloropropane and toluene reactants. Hence, the yield of desired product is substantially reduced, notwithstanding the presence of added hydrogen chloride which functions as a dehydrohalogenation suppressant. Even where reaction temperatures reside in the freezing range, dehydrohalogenation normally occurs as evidenced by the formation of substantial quantities of dimer. However, in the presence of an organonitro compound, yields in excess of 80% of theory are obtained, thus rendering the process of the present invention commercially feasible and attractive.

We claim:

1. In preparing 2,2-di(p-tolyl) propane by reacting a solution of 2-(p-tolyl)-2-chloropropane with toluene in the presence of anhydrous aluminum chloride catalyst and a sufficient quantity of added hydrogen chloride to saturate said solution, the improvement therein which comprises: carrying out the reaction in the presence of a catalyst complex comprising aluminum chloride, hydrogen chloride, toluene and an organonitro compound selected from the group consisting of a nitroalkane and a nitroaromatic hydrocarbon.

2. A process according to claim 1 in which the organonitro compound is added in an amount sufficient to supply from about 1 to 10 moles per mole of aluminum chloride.

3. A process according to claim 1 in which the reaction temperature is in the range of from about minus 30° C. to plus 30° C.

4. A process according to claim 1 in which a catalyst complex comprising aluminum chloride, hydrogen chloride, toluene and an organonitro compound is formed prior to use.

5. A process according to claim 4 in which the organonitro compound is nitromethane.

6. A process according to claim 4 in which the organonitro compound is nitroethane.

7. A process according to claim 4 in which the organonitro compound is nitropropane.

8. A process according to claim 4 in which the organonitro compound is nitrobenzene.

9. A process according to claim 4 in which the organonitro compound is nitrotoluene.

10. An improved process for preparing 2,2-di(p-tolyl) propane which comprises: reacting 2-(p-tolyl)-2-chloropropane with toluene in the presence of anhydrous aluminum chloride catalyst and both a sufficient quantity of added hydrogen chloride and nitrobenzene at a temperature of about 0° C. to 5° C., said nitrobenzene being present in a quantity equal to 2.7 moles of the latter per mole of the aluminum chloride catalyst on a weight basis, diluting the reaction mixture with water, and recovering resultant 2,2-di(p-tolyl) propane.

11. A complex catalyst composition comprising: toluene saturated with hydrogen chloride gas and containing dissolved therein 1 to 10 moles of an organonitro compound per mole of aluminum chloride, said organonitro compound being selected from the group consisting of a nitroalkane and a nitroaromatic hydrocarbon.

References Cited in the file of this patent

UNITED STATES PATENTS

| | | |
|---|---|---|
| 2,076,201 | Langedijk | Apr. 6, 1937 |
| 2,302,721 | Schmerling | Nov. 24, 1942 |
| 2,385,303 | Schmerling | Sept. 18, 1945 |
| 2,406,639 | Schmerling | Aug. 27, 1946 |
| 2,719,871 | Hiatt | Oct. 4, 1955 |
| 2,756,265 | Hollyday | July 24, 1956 |
| 2,794,822 | Schweitzer | June 4, 1957 |